United States Patent
Scharlack

[15] 3,647,267
[45] Mar. 7, 1972

[54] SKID CONTROL SYSTEM
[72] Inventor: Ronald S. Scharlack, San Antonio, Tex.
[73] Assignee: Kelsey-Hayes Company, Romulus, Mich.
[22] Filed: Nov. 12, 1969
[21] Appl. No.: 875,993

[52] U.S. Cl. ...........................................303/21 P, 303/20
[51] Int. Cl. .......................................B60t 8/08, B60t 8/12
[58] Field of Search ..................188/181; 303/21, 20; 317/5; 324/160–162; 340/262–263

[56] References Cited

UNITED STATES PATENTS

| | | | |
|---|---|---|---|
| 3,245,213 | 4/1966 | Thompson et al. | 303/21 BB |
| 3,467,443 | 9/1969 | Okamoto et al. | 303/21 BB |
| 3,494,671 | 2/1970 | Slavin et al. | 303/21 P |
| 3,498,682 | 3/1970 | Mueller et al. | 303/21 BB |
| 3,499,689 | 3/1970 | Carp et al. | 303/21 P |
| 3,511,542 | 5/1970 | Fielek, Jr. | 303/21 P |
| 3,520,575 | 7/1970 | Steigerwald | 303/21 BB |
| 3,525,553 | 8/1970 | Carp et al. | 303/21 P |

*Primary Examiner*—Milton Buchler
*Assistant Examiner*—Stephen G. Kunin
*Attorney*—Harness, Dickey & Pierce

[57] ABSTRACT

A system for controlling the braking of a wheeled vehicle to prevent skidding, in which the braking effect applied to the wheel is effectively responsive to one or a combination of two conditions, either a large spin-up rate of the wheel, or a small wheel speed versus car speed deviation, in this latter case it being assumed that the car speed remains essentially constant. The system generates a signal which is an approximation of the function representative of the time remaining to effectively reapply the brakes in order to anticipate the hydraulic and mechanical inertia of the system in reapplying the brake pressure to the wheels. The system includes a apparatus for sensing the wheel angular velocity, a differentiater circuit for differentiating the wheel velocity to achieve an angular acceleration signal, this acceleration signal being stored in the system for use in generating a wheel speed deviation from vehicle speed signal, and a system for sensing the rate of change of the wheel speed velocity relative to the car velocity or wheel speed deviation from vehicle speed and a second circuit for sensing the rate of spin-up of the wheel, this latter circuit including a function generator system, in the form of a nonlinear device, to vary the effect of the wheel spin-up signal rate in accordance with its magnitude. The skid control solenoid is controlled in accordance with one of these signals.

10 Claims, 3 Drawing Figures

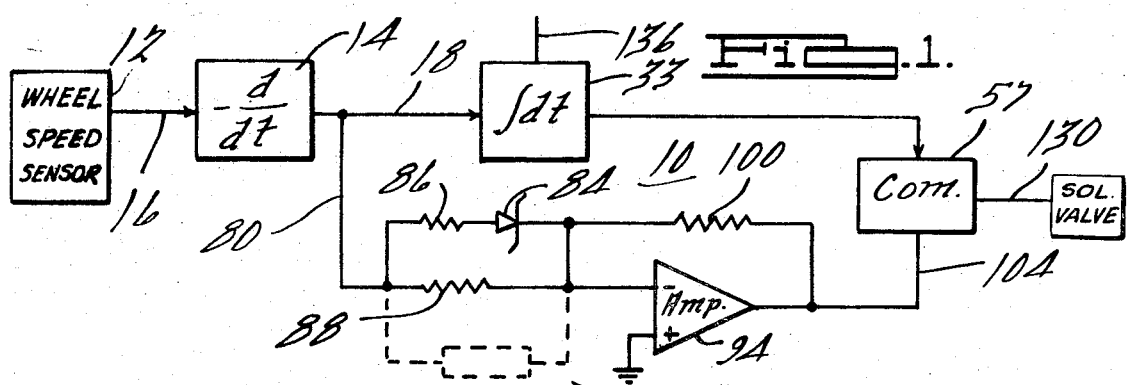
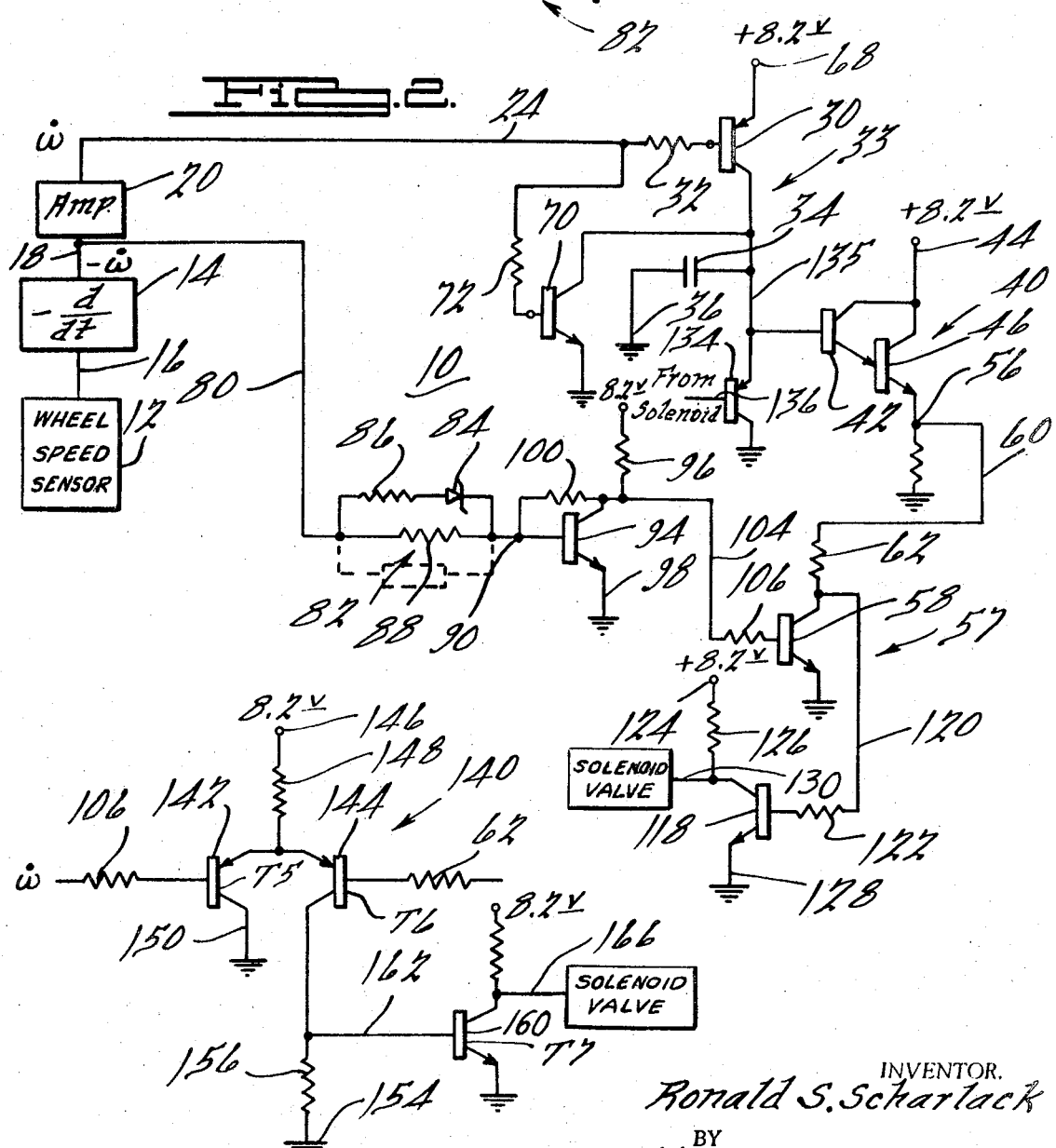

SKID CONTROL SYSTEM

BACKGROUND AND SUMMARY OF THE DISCLOSURE

This invention relates generally to vehicle braking systems and, more particularly, to a brake and skid control system for preventing wheel skidding and minimizing stopping distances while simultaneously maintaining directional stability through the control of the application of braking pressure in response to the spin-up rate of the wheel or, in the alternative, the sensing of a small wheel speed deviation from vehicle speed.

One of the major difficulties which arises in braking a moving vehicle, such as an automobile, an aircraft or other wheeled vehicle, occurs when the braked wheel, or wheels, "lock up." This "lock up" condition tends to create an unstable situation in the controlled motion of the vehicle. At the same time, a locked wheel condition generally increases stopping distance.

Several skid control systems have been evolved which provide maximum efficiency under various road conditions while utilizing a relatively simple computational system. One such system, disclosed in copending application of David B. Eisenhaure and Ronald S. Scharlack, Ser. No. 626,626, filed Mar. 28, 1967, now U.S. Pat. No. 3,508,795, issued Apr. 28, 1970 takes into account the changing road conditions which result in a change in the coefficient of friction. In this system, the linear and angular accelerations of the braking wheel, or wheels, are sensed by appropriate accelerometer devices. The output signals from such accelerometers are fed to a simple analog computer system which produces output signals proportional to the rate of change of the braking force as a function of time and to the rate of change of the wheel slip as a function of time.

Another system has been evolved which eliminates the requirement of accelerometer devices for sensing the linear and angular acceleration of the braking wheel and substitutes, in lieu thereof, a single angular velocity sensing device for providing a condition signal which is indicative of the angular wheel velocity. This condition signal provides all of the information necessary to effectively operate the skid control system of the invention disclosed in a second copending application of Ronald S. Scharlack, Ser. No. 769,035, filed Oct. 21, 1968, now U.S. Pat. No. 3,532,392, issued Oct. 6, 1970 and accomplishes essentially maximum efficiency and optimum operation of the braking system. In this system, it is recognized that the first derivative of the brake force is proportional to the rate of change of acceleration, after eliminating the effectively constant wheel mass. Thus, to maximize the braking force, (that is, optimum slip on the brake force versus slip curve), the rate of change of acceleration must be at a zero point when the wheel is accelerated, this point being at the point of maximum brake force. In this system, the deceleration signal generated within the control system is monitored and the brakes are triggered to the "on" condition when a preselected deceleration is reached which is indicative of an incipient skid condition. Also, a further system utilizing the just described features and principles, is disclosed in third copending application of Hugh E. Riordan, Ser. No. 7,711,531, filed Oct. 29, 1968, now U.S. Pat. No. 3,532,393, issued Oct. 6, 1970. In this latter system, the circuitry has been reduced to further simplify and reduce the cost of previous systems.

The foregoing applications are cited herein to incorporate discussions of the operation of a braked wheel and the effects of varying the force applied to a braked wheel on the skidding tendencies of the wheel. The system of the present invention utilizes a different mode of operation in controlling the application of the brakes or braking force to a wheel by sensing the wheel angular velocity and deriving two signals representative of conditions of the spin-up of an unbraked wheel. The first of these conditions is a relatively low-wheel deviation relative to a previously defined reference signal. The second condition sensed is the spin-up rate of the wheel upon release of the braking force from that wheel. The effect of this latter signal on the control device is varied in accordance with some preselected function which is responsive to the magnitude of spin-up rate. In the disclosed embodiment, this function circuit takes the form of a resistor in parallel with a resistor-zener diode combination. This circuit approximates the time remaining, a variant of the spin-up rate, to reapply brake pressure before the actual force is applied to the wheels. These two signals are utilized to control the reapplication of the brakes to the wheel as it is spinning-up, one of the conditions being a preset high rate of wheel spin-up and the other condition being a preset low wheel speed deviation as compared to car speed deviation, this latter condition being previously defined in the circuitry.

Accordingly, one object of the present invention is to provide an improved controlled braking system for a vehicle;

It is another object of the present invention to provide an improved skid control system for the brake or brakes of a wheeled vehicle;

It is still another object of the present invention to provide a brake control system of the type described which controls the reapplication of the brakes in accordance with two sensed conditions of the wheel spin-up;

It is still a further object of the present invention to provide an improved skid control system for the brakes of a vehicle which senses the rate of spin-up of the wheel and the wheel deviation from a fixed point and correlates these two signals to control the reapplication of brake force;

It is another object of the present invention to provide an improved skid control system of the type described which operates to reapply braking force in response to a sensed high rate of spin-up of the wheel or a sensed low wheel deviation relative to a fixed signal;

It is still a further object of the present invention to provide an improved skid control system for the brakes of a vehicle which is simple and inexpensive to manufacture and install and is reliable in use;

It is still another object of the present invention to provide an improved anticipation circuit for varying the effect of the spin-up rate signal on the output control device in accordance with the anticipated inertia of the system which delays the actual application of the brake force to the wheels after reapplication of brake pressure.

Further objects, features and advantages of this invention will become apparent from a consideration of the following description, the appended claims and the accompanying drawings in which:

FIG. 1 is a schematic diagram illustrating a preferred circuit for controlling the reapplication of braking force to the wheels of the vehicle;

FIG. 2 is a schematic diagram illustrating certain details of the system of FIG. 1; and FIG. 3 is a schematic diagram illustrating a modification of a portion of the system of FIGS. 1 and 2.

The skid control system of the present invention is particularly adapted to be utilized and will be described specifically for use in an automotive vehicle. However, as was stated above, it is to be understood that the features of the invention may be utilized with other types of vehicles including aircraft and other wheeled vehicles which are adapted to provide a braking force through a wheel type of element. In the case of an automotive use, the system of the present invention may be utilized in connection with either the front wheels, the rear wheels or both the front and rear wheels. The same use occurs in other vehicles which utilize longitudinally displaced braking wheels. However, for simplicity, the system will be described for use in conjunction only with the rear wheels of an automotive vehicle.

The system of the present invention generally includes a capacitor which has a zero charge when the wheels are traveling at the same rate as the vehicle, no brake force being applied. When the solenoid is applied, the capacitor is charged at a rate which is a function of the deviation of the wheel speed from the vehicle speed or the rate of wheel deceleration. Thus, the charge on the capacitor is proportional to the deviation of the wheel speed from the vehicle speed at any time in the cycle. Subsequently, as the wheel is spinning up the charge on the capacitor is drained off at a rate corresponding to the rate of change of wheel velocity. Thus, a signal is developed at the end of the first cycle which is proportional to the velocity deviation of the wheel relative to the car velocity, it being assumed that the car velocity remains a relative constant for each cycle. The charge on the capacitor is reset during each cycle to approximate the decreasing vehicle velocity. Thus, this voltage on the capacitor is increased during the period that the brake force is applied and, when the force switches from applied to not applied and the wheel is still decelerating. When the wheel reaches the minimum, the charging process is terminated and the charge applied to the capacitor is related to the maximum deviation point of the wheels as related to the vehicle velocity at the start of the cycle.

The aforementioned current drain from the capacitor occurs when the wheel begins the acceleration portion of the cycle or the spin-up, the current being drawn from the capacitor at a rate which is proportional to the wheel acceleration so that the voltage on the capacitor corresponds to the deviation of the wheel from the velocity at the start of the cycle being considered. This voltage on the capacitor at any instant in the cycle corresponds to the wheel velocity deviation from the vehicle velocity at the start of that particular cycle and is the integral of the wheel deceleration and acceleration curve, the capacitor being an integrating device. It is again noted that the charge on the capacitor is reset to zero at the point of reapplication of the brakes to ready the circuit for the start of the next cycle. The voltage on the capacitor is sensed or read through a high-impedance device to insure low leakage, this voltage being fed to a comparator circuit which may take the form of a single transistor or a differential amplifier circuit.

The acceleration or spin-up signal is also fed to a second leg of the control circuit, the second leg including a nonlinear device generating a two-stage spin-up rate sensing circuit. In this connection, it is to be noted that the brake system of a vehicle has certain inertia which introduces a delay between the application of the brake pressure and the actual appearance of the brake force at the wheels. This inertia or delay becomes more critical as the rate of spin-up of the wheel increases and it becomes necessary to further anticipate the point of reapplication of the brake force by reapplying the brake pressure earlier in the wheel run down and spin-up cycle. In this way, variations in surface conditions, high$\mu$ as compared to low$\mu$, may be accommodated. Accordingly, it becomes necessary to provide a circuit which gives greater than a straight line effect to the spin-up rate signal at higher spin-up rates. In the circuit of the present invention, a zener diode is used to sense the spin-up rate, and when the rate is large enough, to introduce a greater slope to the spin-up rate versus time signal function. It is to be understood that only two rates are disclosed for illustrative purposes, i.e., a resistor which is linear in effect and a zener diode and resistor combination which is nonlinear in effect. The circuit could be provided with several more parallel legs with zener diodes having different avalanche characteristics. On the other hand, other function generator circuits, to approximate any desired function, may be inserted between the spin-up rate signal and the output device to vary the effect of the spin-up rate signal on the output.

Thus, a voltage is generated which is proportional to the time delay needed for the pressure to reach the level required to counteract the variations in acceleration rate of the wheels from one surface to another. The two signals are brought together at the above-described single comparator device or the differential circuit to provide an output signal which is controlled by or responsive to one of two conditions, either the charge on the capacitor indicating a low wheel deviation condition or the signal from the other leg indicating a high spin-up rate condition. Both conditions may be variably adjusted to provide control at any point in the operation of the braking system. When the conditions are such that one or the other of the two signals creates an output signal from the comparator circuit, the output signal is used to turn off the solenoid and arrest the wheel spin-up. Thus, the system starts into the second portion of the cycle. At the time the solenoid is turned off, the capacitor is short circuited to discharge the capacitor and reset the circuit.

Referring now to FIG. 1, there is illustrated a schematic block diagram of a control system 10 which may be utilized to control the operation of the brake force applying solenoid in accordance with the features discussed above. The system includes a transducer 12 for sensing the wheel angular velocity omega ($\omega$), the output signal of which is fed to a negative differentiator circuit 14 by means of a conductor 16. The output of the differentiator circuit 14 produces a signal on conductor 18 which is the negative of the rate of change of wheel velocity or wheel acceleration. This signal on conductor 18 is fed to a negative amplifier and integrator circuit 33 which, on the rundown portion of the wheel velocity signal, produces an output signal which is a function of the wheel velocity signal. When the spin-up portion of the wheel cycle commences, which is achieved on the lowest point of the wheel speed wave form, the integration of the !heel velocity signal ceases. The integrated signal is stored within the circuit 33.

The circuit 33 also includes a circuit which changes the stored signal in accordance with a particular function of the spin-up portion of the cycle. Ultimately, the stored signal at any instant of time is a function of the deviation of the wheel velocity from the vehicle velocity at the start of that particular cycle. As will be seen from a further description of the system, the brakes are reapplied as a function of a low-wheel speed deviation from vehicle speed signal, either taken alone or in combination with a signal to be described which increases the effect of the spin-up rate signal when a preselected rate has been reached.

Referring now to the lower portion of FIG. 1, it is seen that the signal on conductor 80 is also fed to a nonlinear circuit 82 which, in the illustrated embodiment includes a zener diode 84 connected in series with a resistor 86, the series combination 84,86 being connected in parallel with a resistor 88. As is noted from the dotted lines, additional circuits may be added to vary the effect of the spin-up rate on the output circuit in accordance with any desired function. The output of the circuit 82 is fed to an operational amplifier 94, the positive output of which is grounded and the negative output includes a feedback signal from the output of the operational amplifier to a negative input thereof by means of a resistor 100.

The outputs from the integrator circuit 33 and the operational amplifier 94 are fed to a comparator circuit 57 which utilizes a combination of the low-wheel speed deviation from vehicle speed signal from the integrator circuit 33 and a high spin-up rate signal, as modified by the nonlinear circuit 82, to produce an output signal on conductor 130 which output signal is utilized to reapply braking force to the wheel. The reapplication of the braking force is also utilized to reset the integrator circuit 33 by means of an input to the conductor 136.

Referring now to FIG. 2 of the drawings, there is illustrated specific details of the control system 10 described in conjunction with the description of FIG. 1 which is adapted to control the operation of the solenoid and apply or reapply the brakes, and particularly to turn the solenoid off at preselected conditions of the wheel velocity and acceleration. The system includes a transducer 12 for sensing the wheel angular velocity, the output signal $\omega$ being fed to a differentiator circuit 14 by means of a conductor 16. The output of the differentiator circuit 14 produces a signal on conductor 18 which is the negative of the rate of change of wheel velocity, or wheel acceleration. The signal on conductor 18 is amplified and inverted through an amplifier circuit 20 to produce the rate of change of the velocity signal or a positive acceleration signal, this signal being fed to the main circuit 10 by means of a conductor 24.

As is seen from the above mentioned copending applications, upon the application of the braking force, the wheels will start to decelerate until a predetermined deceleration is reached. At this time, the brakes will be released by means of actuating the solenoid in the skid control system, the solenoid being interposed between the master cylinder and the wheel cylinders to remove the effect of the braking force when the solenoid is applied and reapply the braking force when the solenoid is deenergized.

This wheel deceleration signal is fed to a transistor 30, and particularly the base circuit thereof, by means of a resistor 32. The signal is initially applied to the base of transistor 30 at a time when the wheel velocity starts to decrease and maximum signal occurs at the maximum negative slope of the wheel velocity signal. This signal is fed to a capacitor 34 through the conduction of the transistor 30. In the preferred embodiment, the base electrode of transistor 30 is biased such that the collector current is zero when the acceleration signal is zero. Thus, the capacitor 34 is provided with an initial charge of zero. One side of the capacitor is connected to ground by means of conductor 36.

The voltage on the capacitor 34 is sensed by means of a Darlington circuit 40 which includes an emitter-follower connected with transistor 42 having a collector electrode connected to a positive 8.2 volts at input terminal 44, and an emitter electrode connected to the base circuit of a second transistor 46. The output of transistor 46, particularly the emitter electrode thereof, is fed from a node 56 to the collector electrode of a transistor 58 by means of a conductor 60 and a resistor 62. The transistor 58 forms the device which senses and compares the two signals described above, one being the wheel deviation signal and the other being the rate of change of wheel velocity signal.

The wheel velocity signal is fed to a conductor 24 and is sensed by means of an input transistor 70 which has a collector electrode connected to a positive 8.2 voltage potential at input terminal 68 through the emitter-collector circuit of transistor 30, and the emitter electrode is connected to ground. This connection will be explained hereinafter in connection with the description of the voltage developed on capacitor 34. The voltage on conductor 80 is fed to the nonlinear combination circuit 82 which includes a zener diode 84 connected in a series with a resistor 86, the series combination 84,86 being connected in parallel with a resistor 88. This combination circuit (resistors 88 and 86, and zener diode 84) are used to vary the effect of the spin-up rate signal on the transistor 58, as conducted through transistor 94 in accordance with the discussion above. The output of the combination 82 is fed to node 90, the voltage at node 90 following a preselected slope as the current builds up until such time that the zener breakdown voltage is achieved. At this time, the slope will increase due to the lower impedance of the combination circuit 84,86. The voltage at the node 90 is fed to a transistor 94, the transistor 94 including a collector electrode connected to a positive source of potential through a resistor 96 and the emitter electrode being grounded at 98. Also, a feedback circuit is formed by means of resistor 100. The output of transistor 94 is fed to the base electrode of transistor 58 by means of a conductor 104 and a resistor 106.

The combined output of transistor 58 is fed to a transistor 118 by means of a conductor 120 and a resistor 122. The transistor 58, when conductive, drops the voltage on the conductor 120 down to substantially ground potential or approximately ½ volt. The conductivity of transistor 58 is governed by the signal impressed on conductor 104 and resistor 106 in response to the sensing of the rate of acceleration or rate of spin-up of the wheel. On the other hand, the voltage of conductor 120, in the absence of the conducting of transistor 58, follows the voltage output from the emitter electrode of transistor 46 in response to the wheel deviation signal. Thus, when the wheel deviation signal drops to a preselected low value, the signal on conductor 120 also drops to a low value. With a low-voltage signal on conductor 120, the transistor 118 will be cut off to provide a flow of current from a positive 8.2 volt potential at input terminal 124, through resistor 126, to an output terminal 130. The output terminal 130 is connected to the solenoid valve of the skid control system. In order to turn the solenoid off, the voltage on conductor 120 must be increased to turn transistor 118 on.

The signal from the solenoid is also fed to a transistor 134 having an emitter electrode connected to the capacitor 34 and a collector electrode connected to ground. The emitter-collector circuit of transistor 134 is connected in series with the capacitor 34 to shunt the capacitor when the solenoid is turned on.

In operation, the output signal on conductor 24 is fed to the transistor 30, this signal varying in accordance with the rate of change of wheel velocity. This signal is amplified through the transistor 30, and fed to the capacitor 34 to charge the capacitor during the period when the wheel is decelerating with a voltage which is proportional to the deceleration signal on conductor 24. When the spin-up of the wheel commences, that is after the achieving of the lower point of the wheel speed wave form, the voltage on the conductor 24 reverses in polarity to turn the transistor 30 off. Thus, the integrated signal from the conductor 24 is stored in capacitor 34.

The wheel acceleration signal is also fed to the transistor 70 connected in parallel with the capacitor 34. Thus, as the wheel commences the spin-up portion of the cycle, the conductivity of transistor 70 starts from zero and increases as the rate of spin-up increases to increase the rate of discharge of the capacitor 34. Accordingly, the current drawn from the capacitor 34 is proportional to the rate of spin-up of the wheel. The charge on the capacitor at any instant is a function of the deviation of the wheel velocity from the vehicle velocity at the start of that particular cycle. The signal on capacitor 34 is sensed by the Darlington circuit 40, and is then fed to the output conductor 120 by means of conductor 60 and resistor 62. When the signal drops to a preselected low voltage, the transistor 118 is turned off to provide a high voltage on output terminal 130. The high voltage causes the solenoid to turn on in response to the nonconductivity of transistor 118. This solenoid signal is then fed to the transistor 134 to reset capacitor 34.

The aforementioned circuit describes the operation of the system when a preselected low-wheel deviation signal is sensed. On the other hand, if a high wheel acceleration is sensed, this signal is fed through a circuit to cause conduction of the transistor 58 to lower the voltage at the output conductor 120 irrespective of the voltage at conductor 60. The parallel combination circuit 82 has been provided to increase the effect of the spin-up rate signal when a preselected rate has been reached, for example, a voltage corresponding to the zener breakdown voltage of the zener diode 84. In this way, the impedance of the circuit to the transistor 94 is decreased to increase the effect of the signal on conductor 80.

Referring now to FIG. 3, there is an alternative embodiment of the circuit of the lower right hand portion of the circuit of FIG. 1. Particularly, the circuit of FIG. 3 illustrates the modification which may be substituted for the transistor 58, the conductor 120, the resistor 122, transistor 118 and the remaining circuit connected to transistor 118. The system includes a differential amplifier circuit 140, having a pair of transistors 142 and 144 connected in the conventional differential amplifier configuration. The emitter electrodes of transistors 142 and 144, are connected to a source of positive potential at input terminal 146 through a resistor 148. The collector electrode of transistor 142 is grounded at 150 and the collector electrode of transistor 144 is connected to ground at 154 through a resistor 156. The input signals from the wheel speed deviation from vehicle speed portion of the circuit are fed to the base circuit of transistor 144 by means of the resistor 62. Similarly, the nonlinear function of the wheel acceleration is fed to the base electrode of transistor 142 through the resistor 106.

The output of the differential amplifier circuit 140 is fed to an output transistor 160 by means of a conductor 162. The transistor 160 is connected in a similar arrangement to that described in conjunction with the transistor 118 whereby the voltage at an output terminal 166 is controlled by the conduction of transistor 160. Accordingly, if the nonlinear function of the acceleration rises to a preselected level, the output of the differential circuit 140 will lower the voltage being fed to the conductor 162 to turn the transistor 160 off. Similarly, if the wheel deviation signal and input resistor 62 drops to a low level, the conductivity of transistor 144 will be increased to turn on transistor 160. In either event, the output voltage signal at conductor 166 turns the solenoid on to enable the brake pressure or braking force to take effect.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A skid control system for use in controlling the braking force applied to at least one wheel of a vehicle, the system including a solenoid controlled valve for controlling the application of the braking force to the wheel and a transducer for sensing wheel velocity and generating a signal which is a function of the angular velocity of the wheel, skid detector means for detecting the occurrence of an incipient skid condition and supplying a brake pressure release signal to said solenoid controlled valve to thereby alleviate said skid condition, the improvement comprising means for reapplying the braking force to the wheel upon alleviation of said incipient skid condition including means for generating a reference deviation signal which represents the starting point of the wheel speed at a preselected portion of the braking cycle, means for generating a wheel deviation signal which deviates from said reference deviation signal and varies as a function of the difference between the speed of the vehicle and the speed of the wheel, output control means responsive to a preselected minimum low-wheel deviation signal for controlling the solenoid valve, and means responsive to the rate of spin-up of the wheel for varying the effect of said wheel deviation signal on said output control means, said last-named means including means for varying the variation in effect of the deviation signal in response to variations in spin-up rate of the wheel.

2. The improvement of claim 1 wherein said reference deviation signal-generating means includes a signal level storage circuit, said storage circuit being connected to store a preselected function of said angular velocity.

3. The improvement of claim 2 further including means for generating a rate of change of angular velocity signal in response to said angular velocity signal, said stored signal being said reference deviation signal.

4. The improvement of claim 3 further including means for varying said deviation signal in response to variations in said angular wheel velocity.

5. The improvement of claim 4 wherein said minimum low-wheel deviation signal switches said solenoid valve from a first state to a second state.

6. The improvement of claim 5 further including resetting circuit means connected to said storage means and wherein the switching of said solenoid valve from one state to the other state resets said storage circuit.

7. In a skid control system for use in controlling the braking force applied to at least one wheel of a vehicle, the system including a solenoid controlled valve for controlling the application of braking force to the wheel and a transducer for sensing wheel velocity and generating a signal which is a function of the angular velocity of the wheel skid detector means for detecting the occurrence of an incipient skid condition and supplying a brake pressure release signal to said solenoid controlled valve to thereby alleviate said skid condition, the improvement comprising means for reapplying the braking force to the wheel upon alleviation of said incipient skid condition including means for sensing the rate of change of wheel velocity, means for sensing the wheel velocity deviation from the vehicle velocity, output circuit means for controlling the valve in response to said wheel velocity deviation and said rate of change of wheel velocity, nonlinear means connected to said rate-sensing means for varying the effect of the rate-sensing signal on the output circuit in response to the rate of change of spin-up as a nonlinear function during the spin-up portion of the brake cycle, said nonlinear means varying the variation in effect of the rate sensing signal in response to variations in the spin-up rate of the wheel, and means responsive to said nonlinear circuit for controlling said solenoid in response to one of said linear signals achieving a preselected value.

8. The improvement of claim 7 wherein said nonlinear means senses the spin-up rate to generate and anticipation signal to anticipate the delay between reapplication of the brake pressure and brake force.

9. The improvement of claim 8 wherein said nonlinear means generates a first linear signal in response to a first rate of change of wheel velocity signals and generating a second signal, different from said first signal in response to a second range of rate of change signals.

10. The improvement of claim 9 wherein said second signal is linear.

* * * * *